(12) United States Patent
Fischbein

(10) Patent No.: US 8,752,897 B2
(45) Date of Patent: Jun. 17, 2014

(54) VEHICLE SEAT

(75) Inventor: Igor Fischbein, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 13/211,210

(22) Filed: Aug. 16, 2011

(65) Prior Publication Data

US 2012/0043797 A1   Feb. 23, 2012

(30) Foreign Application Priority Data

Aug. 17, 2010   (DE) .......................... 10 2010 039 395

(51) Int. Cl.
*B60N 2/02* (2006.01)

(52) U.S. Cl.
USPC ............ 297/322; 297/339; 297/329; 248/429

(58) Field of Classification Search
USPC ............ 297/322, 339, 344.13, 229; 248/424, 248/429
See application file for complete search history.

(56) References Cited

U.S. PATENT DOCUMENTS

| | | | | |
|---|---|---|---|---|
| 1,688,316 A * | 10/1928 | De Veau | .......................... | 248/429 |
| 3,022,975 A * | 2/1962 | Horton et al. | .................. | 248/420 |
| 3,147,945 A * | 9/1964 | Leslie et al. | ................... | 248/394 |
| 3,182,947 A * | 5/1965 | Akira | ............................. | 248/421 |
| 3,993,280 A * | 11/1976 | Surbaugh | ...................... | 248/405 |
| 4,491,366 A * | 1/1985 | Silber | ........................... | 297/329 |
| 4,648,654 A * | 3/1987 | Voss | ............................... | 297/313 |
| 4,756,576 A * | 7/1988 | Bianchi et al. | ................. | 297/325 |
| 4,787,593 A * | 11/1988 | Pipon et al. | .................... | 248/396 |
| 5,145,232 A * | 9/1992 | Dal Monte | ..................... | 297/329 |
| 5,586,740 A * | 12/1996 | Borlinghaus et al. | .......... | 248/157 |
| 5,692,802 A * | 12/1997 | Aufrere et al. | ................. | 297/337 |
| 5,746,465 A * | 5/1998 | Jones et al. | .................... | 296/65.03 |
| 6,158,809 A * | 12/2000 | Gobbers et al. | ........... | 297/344.17 |
| 6,302,482 B1 * | 10/2001 | Moll et al. | ..................... | 297/340 |
| 6,488,337 B1 * | 12/2002 | De Voss et al. | ........... | 297/344.13 |
| 7,404,584 B2 * | 7/2008 | Maruyama et al. | ......... | 296/65.08 |
| 7,533,936 B2 * | 5/2009 | Ujimoto et al. | ........... | 297/344.13 |
| 7,556,234 B2 * | 7/2009 | Ito et al. | ......................... | 248/429 |

FOREIGN PATENT DOCUMENTS

| | | |
|---|---|---|
| DE | 102006012136 A1 | 9/2007 |
| DE | 102010039395 A1 | 2/2012 |
| EP | 232687 A1 * | 8/1987 ............... B60N 1/02 |

* cited by examiner

*Primary Examiner* — David E Allred
(74) *Attorney, Agent, or Firm* — Vichit Chea; Price Heneveld LLP

(57) ABSTRACT

The invention relates to a vehicle seat which may be adjusted forward and back along a seat rail arranged on both sides, and in which both the inclination of a seat surface and a back surface and a height thereof may be adjusted. Such a vehicle seat is intended to be adapted very easily and in an uncomplicated manner to the different body sizes of drivers. This is achieved in that a common adjustment mechanism is provided for all seat adjustment sequences, which coordinates the individual adjustment sequences, in that the coordination of the adjustment sequences produces seat adjustments in which the seating position of the respective driver is optimized irrespective of body size.

12 Claims, 4 Drawing Sheets

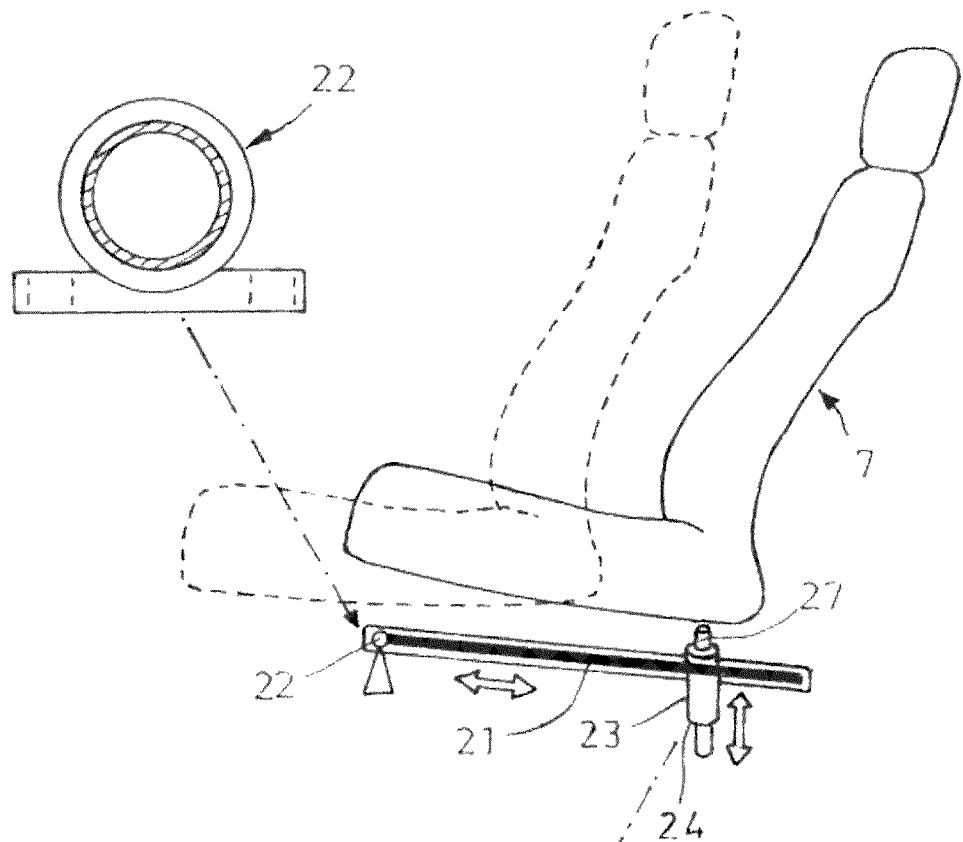
Fig.5
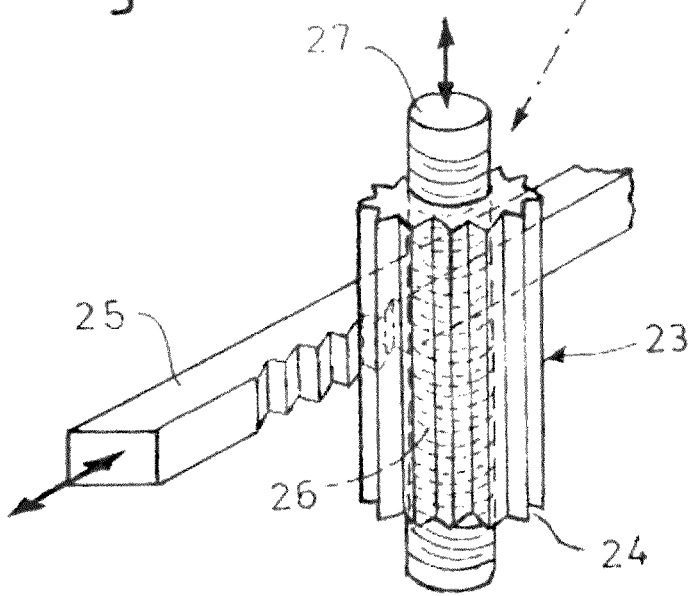

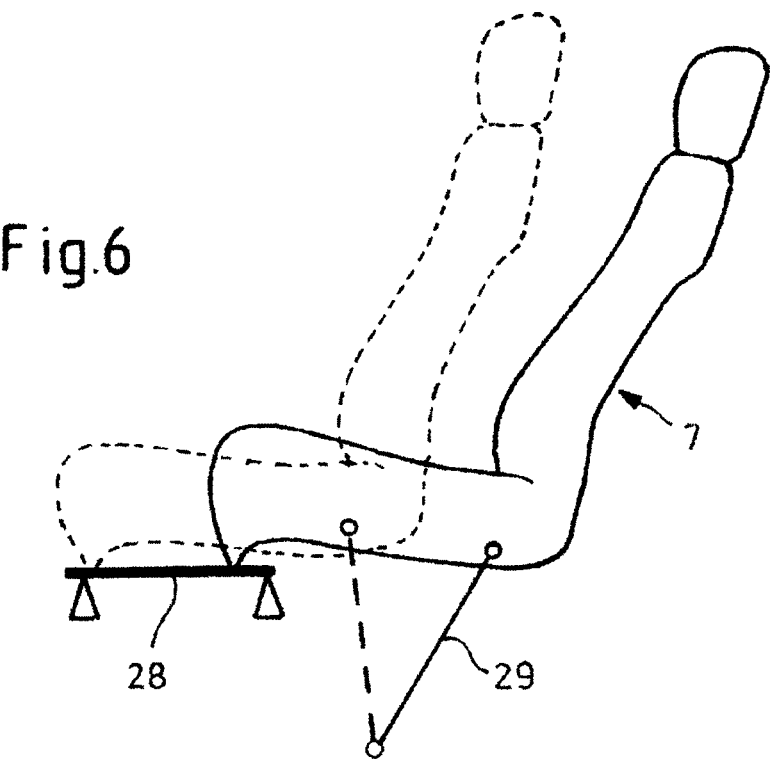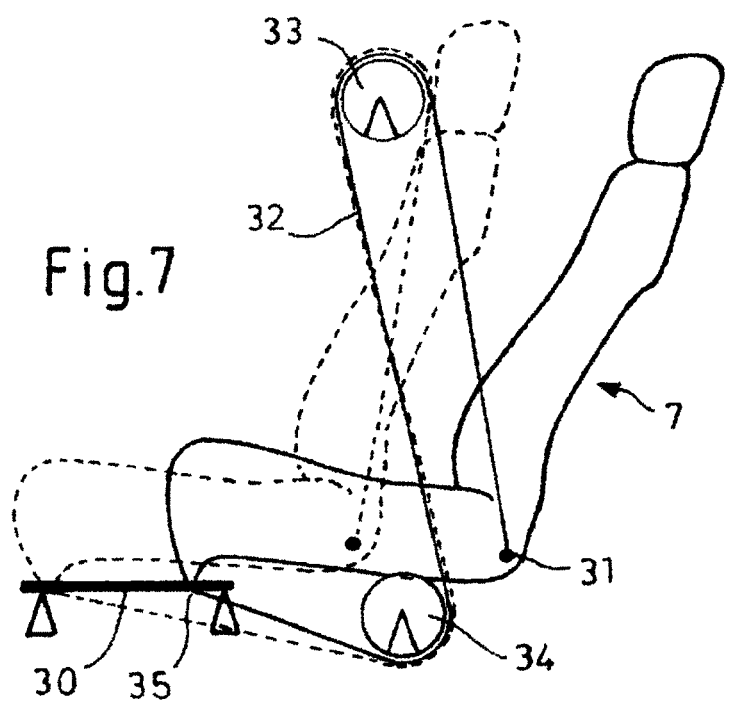

VEHICLE SEAT

FIELD OF THE INVENTION

The present invention generally relates to a vehicle seat, and more particularly to a vehicle seat that is adjustable in forward and rearward directions.

BACKGROUND OF THE INVENTION

The object of the present invention is to provide a vehicle seat, which may be adapted very easily and in an uncomplicated manner to the body size of the respective driver.

SUMMARY OF THE INVENTION

According to one aspect of the present invention, a vehicle seat includes a longitudinal guide operably connected to the vehicle seat. The vehicle seat may be longitudinally adjusted forward and rearward in the direction of travel along the longitudinal guide. A seat surface is disposed on the vehicle seat, such that longitudinal adjustment of the vehicle seat rearward causes a rearward inclination of the seat surface.

According to another aspect of the present invention, a seat for a vehicle includes a longitudinal guide operably connected to the seat. A gearwheel is proximate a rear of the seat and engaged with a toothed rod connected with the seat. The gearwheel includes an internal thread engaged with a threaded pushrod, such that movement of the seat rearward causes rotation of the gearwheel, which moves the threaded pushrod axially downward, resulting in a rearward inclination of the seat surface.

According to yet another aspect of the present invention, a vehicle seat includes a longitudinal guide defined by a seat rail that is operably connected to the vehicle seat. The vehicle seat may be longitudinally adjusted forward and rearward in the direction of travel along the longitudinal guide. A seat surface is disposed on the vehicle seat, such that longitudinal adjustment of the vehicle seat rearward causes a rearward inclination of the seat surface. A rear end of the seat is connected to a rocker, which may be tilted obliquely downward and to the rear when the seat is moved back.

These and other aspects, objects, and features of the present invention will be understood and appreciated by those skilled in the art upon studying the following specification, claims, and appended drawings.

BRIEF DESCRIPTION OF DRAWINGS

FIG. 5 shows an exemplary embodiment of a vehicle seat comprising the forcibly guided lowering of the seat rail to the rear;

FIG. 6 shows an exemplary embodiment with the resilient lowering of the rear region of the vehicle seat; and FIG. 7 shows a forcibly guided lowering of the rear region of the vehicle seat.

DETAILED DESCRIPTION OF EMBODIMENTS

Figure 1:
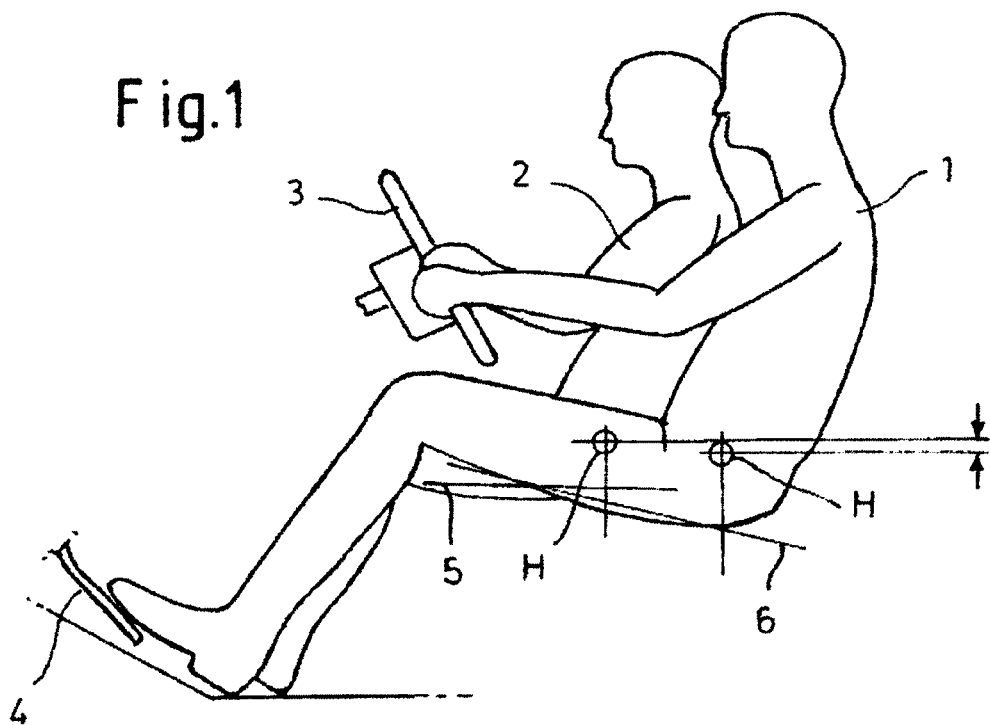
FIG. 1 shows the optimal seating position of two drivers with different body sizes.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

According to one embodiment of the present invention, a common adjustment mechanism is provided for all seat adjustment sequences in a vehicle. The adjustment mechanism coordinates individual adjustment sequences, in that the coordination of the adjustment sequences produces seat adjustments in which a seating position of a respective driver is optimized irrespective of body size, and in that the adjustments are inevitably able to be achieved during the coordination process, in which upper legs of the driver bear fully against a seat surface, irrespective of body size, the driver's feet reach foot pedals exactly, with a slightly angled position of the lower leg, and the hip points are only offset comparatively little relative to one another in the vertical direction, even for all body sizes of the drivers.

The invention is based on the assumption that, irrespective of body size, the ratio of the upper leg length to the lower leg length of the driver is approximately the same. Based on this premise, the vehicle seat according to the invention may be adjusted by means of the adjustment mechanism, which is common to all movement sequences, such that the individual seat components are always optimally adapted to the respective body size of the driver.

The seat adjustment sequences according to the invention may be achieved by different constructions.

One embodiment includes a seat rail that extends approximately horizontally at a front end facing toward a front of the vehicle, and is curved downward toward a rear end thereof. In this exemplary embodiment, the seat is slightly tilted to the rear when pushed back, while a front region of a seat surface is slightly raised and a backrest slightly pivoted back.

The same effect may also be achieved by the seat rail being of split configuration in the direction of displacement and by a front portion extending horizontally and a rear portion being obliquely inclined downward, the rear portion being able to be configured both straight and curved.

A further principle of the adjustment mechanism is characterized in that the seat rail is configured to be continuous, sloping down to the rear, and is supported on one respective front bearing and one respective rear bearing, in that at least the front bearing is configured as a rotary bearing with a horizontal rotational axis, and in that the rear region of the seat rail may be lowered depending on a pushed-forward and a pushed-back position of the seat, the extent of the lowering being all the greater the further the seat is pushed back. In such an adjustment mechanism, the adjustment sequences are not exclusively determined by the geometry of the seat rail, but the seat rail, which is arranged pivotably about the front bearing, is lowered to a greater or lesser extent when the seat is pushed back due to the greater weight displaced to the rear.

In such a principle, the rear bearing is configured to be able to be lowered in a resilient manner. Technically, the capacity for lowering may be achieved by the rear region of the seat rail being spring-loaded and combined with a hydraulic damping element.

In a further exemplary embodiment, which operates according to a similar principle, the rear region of the seat rail may be forcibly guided in a vertical direction. The lowering then takes place via a mechanical gear mechanism, depending on the position of the seat pushed forward and back, the extent of the lowering being all the greater the further the seat is pushed back.

In a further exemplary embodiment, for supporting the front end of the seat, an approximately horizontally extending portion of the seat rail may be provided, on which the front end of the seat slides, while the rear end of the seat may be lowered depending on its pushed-back position.

The rear region may be lowered by the rear end of the seat being connected to a rocker, which may be tilted obliquely downward and to the rear when the seat is moved back.

Alternatively, the rear end of the seat may be forcibly guided depending on the pushed-forward and/or pushed-back position of the seat, by the rear end of the seat being suspended on a first end of a flexible traction element, the traction element being guided via a fixedly arranged upper and lower guide pulley, while a second end is connected to the front end of the seat.

Referring to FIG. 1, an optimal seat position of two drivers 1 and 2 with different body sizes is shown. Drivers 1 and 2 are to be seated on the same vehicle seat, not only a steering wheel 3 and foot pedals 4 having to be operated comfortably, but also an ideal seating position being intended to be achieved, in which the upper legs of the drivers 1 and/or 2 are intended to bear fully against the seat surface, irrespective of body size, while the lower legs in the slightly angled position exactly reach the foot pedals 4, even when the drivers 1 and 2 have different body sizes, when the vehicle seat has been pushed forward and/or back, and hip points H are displaced only comparatively little relative to one another in the vertical direction. The seat surfaces are shown by lines 5 and 6, it being clearly visible that in the retracted seat position, which is provided for a larger driver 1, the inclination of a seat surface 6 sloping to the rear becomes all the greater, the further the vehicle seat is moved back.

The optimal seat position of drivers 1 and 2 of different body size on one and the same vehicle seat is predetermined, in particular, by the geometry of the legs of the drivers 1 and 2, as the proportions of the upper leg length to the lower leg length are approximately the same in all drivers 1 and 2, irrespective of body size. The design of the adjustment mechanism according to the invention for the vehicle seat may be based on this premise.

Figure 2:
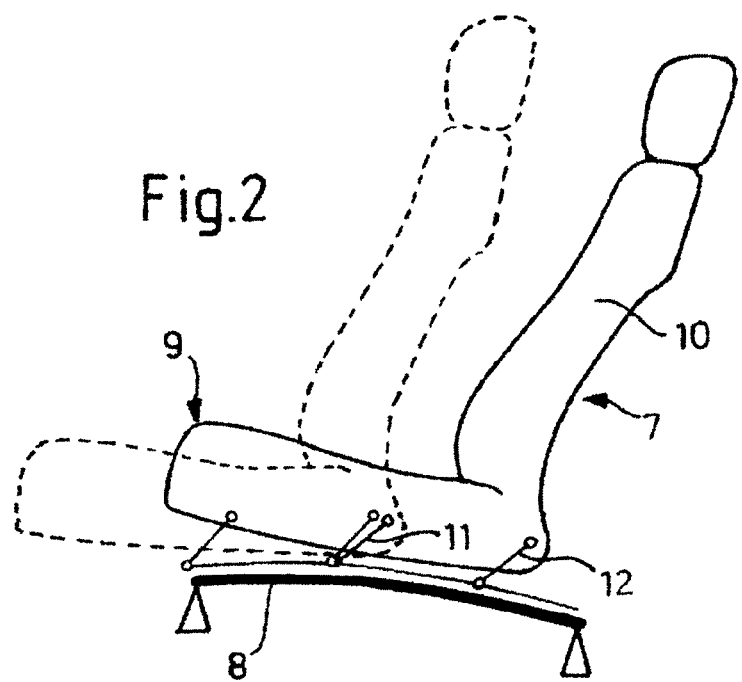
FIG. 2 shows a first exemplary embodiment of a vehicle seat with an adjustment mechanism for an optimal seat position of a driver and namely irrespective of body size.

In FIG. 2, a first exemplary embodiment for the adjustment mechanism of a vehicle seat 7 is shown, which is displaced from a front position shown in dashed lines, which is provided for small drivers 1 and 2, into a rear position shown in solid lines, which is assigned to larger drivers 1 and 2.

In order to achieve the optimal seat adjustment for all body sizes, the vehicle seat 7 is guided on a seat rail 8 shown schematically in the drawings and arranged on both sides, and which is of curved configuration. On a front end facing the vehicle front, the seat rail 8 extends approximately horizontally and toward a rear end the curvature faces downward. Due to this design of the seat rail 8, the vehicle seat is tilted to the rear when pushed back, the seat surface being raised in a front region 9 while a backrest 10 is inclined further back.

In the exemplary embodiment shown in FIG. 2, a further option is additionally provided for adjusting the height of the seat 7 by means of two rockers 11 and 12, which are articulated on the one hand to the lower region of the vehicle seat 7 and on the other hand displaceably to the seat rail 8, and thus form a four-bar linkage.

Figure 3:
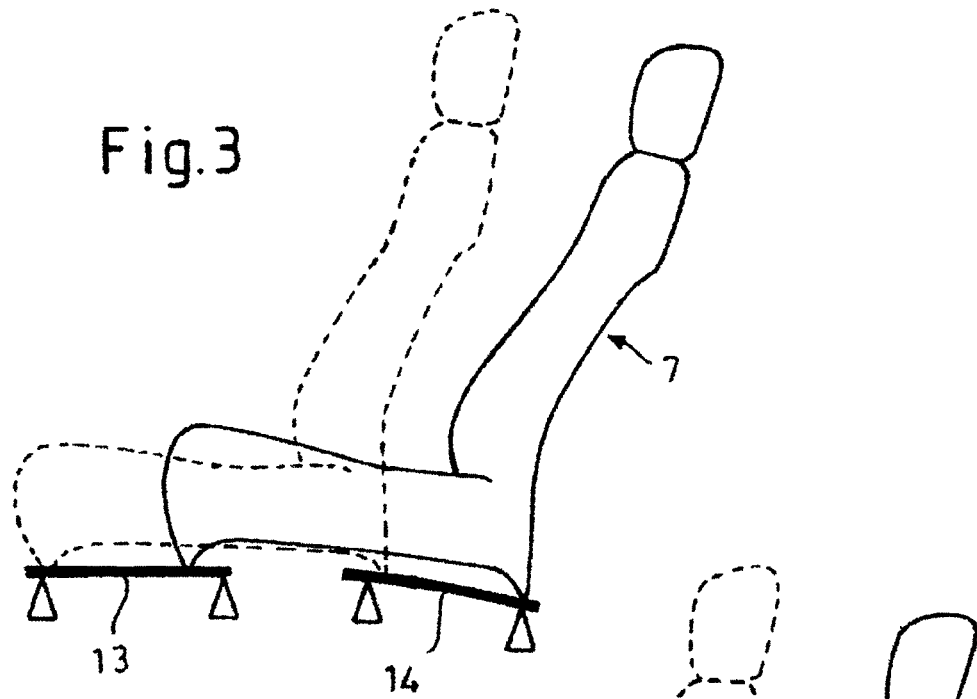
FIG. 3 shows a second exemplary embodiment of a vehicle seat comprising such an adjustment mechanism.

In the exemplary embodiment shown in FIG. 3, the seat rail 8 is split in the direction of displacement into two portions 13 and 14, the front portion 13 extending substantially horizontally and the rear portion 14 being inclined obliquely downward, the inclination being able to be straight or even curved.

In the exemplary embodiment shown in FIG. 4, a seat rail 15 is again configured to be continuous and arranged to slope down to the rear. The seat rail 15 is configured to be straight and is supported on a front bearing 16 and on a rear bearing 17. Thus, at least the front bearing 16 is configured as a rotary bearing with a horizontal rotational axis extending transversely to the direction of travel, while the rear bearing 17 may be lowered.

The lowering is intended to be weight-dependent, i.e., the extent of the lowering is all the greater the further the seat 7 is pushed back. The possibility for lowering is achieved by the rear bearing 17 and/or the rear region of the seat rail 15 being spring-loaded in the vertical direction. The spring, which may be configured as a compression spring or tension spring, is not specifically shown in the drawings. In addition to the spring device, a damping element 18, which is illustrated in the drawings in enlarged view, is provided in which a piston 19 is guided in a cylinder 20 filled with a highly viscous liquid.

Figure 4:
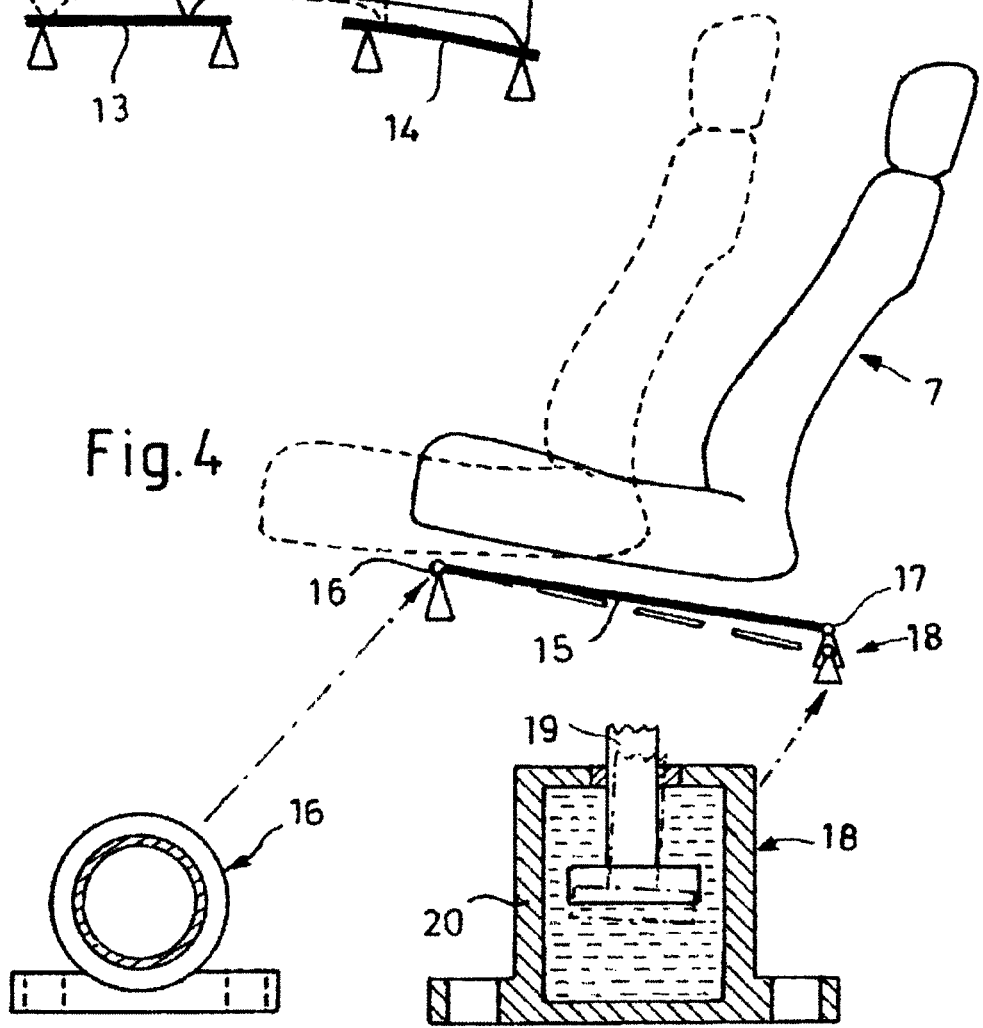
FIG. 4 shows an exemplary embodiment of a vehicle seat comprising an adjustment mechanism in which a capacity for lowering is provided for the rear support bearing of the seat rail.

In the exemplary embodiment shown in FIG. 5, the adjustment mechanism of the vehicle seat 7 functions according to a similar principle as in the exemplary embodiment shown in FIG. 4. While, however, in the adjustment mechanism according to FIG. 4 the lowering of the rear region of the seat rail 15 takes place in a weight-dependent manner, in the exemplary embodiment shown in FIG. 5, the lowering of the rear region of a seat rail 21 is forcibly guided and namely depends on the position of the driver's seat relative to the seat rail 21. A front bearing 22 of the seat rail 21 is also configured as a rotary bearing about which the seat rail 21 may be pivoted, as in the exemplary embodiment according to FIG. 4. In the rear region of the seat rail 21 for raising and/or for lowering the seat rail 21, a gear mechanism 23 is provided, which raises and/or lowers the rear end of the seat rail 21 shown to the right in FIG. 5 of the drawings, depending on the pushed-forward and/or pushed-back position of the vehicle seat 7.

The gear mechanism 23 consists of a gearwheel 24, which may be rotated about a vertical axis. The gearwheel 24 is in engagement with a toothed rod 25, which is coupled to the seat 7, and with the displacement of the seat 7, drives the gearwheel 24. In the central bore of the gearwheel 24, an internal thread 26 is formed, which is in engagement with a vertically arranged threaded pushrod 27, mounted fixedly in terms of rotation. When the gearwheel 24 is rotated, the threaded pushrod 27 is moved in the axial direction. When the vehicle seat 7 is pushed back, the threaded pushrod 27 moves downward and lowers the rear region of the vehicle seat 7. When moving the vehicle seat 7 forward, the pushrod 27, however, moves upward and pivots the vehicle seat 7 counterclockwise into an upright position.

In the exemplary embodiment shown in FIG. 6, only a short portion of a seat rail 28 is provided, which only serves to guide the front end of the seat 7. The rear end of the seat 7 is in turn able to be lowered to the rear, the extent of the lowering being all the greater the further the seat 7 is pushed to the rear. This is achieved in the exemplary embodiment shown in FIG.

6, by the rear end of the seat 7 being connected to a rocker 29, which, when the seat 7 is moved back, may be tilted obliquely downward and backward.

In the exemplary embodiment shown in FIG. 7, the vehicle seat 7 is mounted in a similar manner as in the exemplary embodiment shown in FIG. 6, the front end of the seat 7 being guided on a short portion of a seat rail 30.

The rear end of the vehicle seat 7 is suspended on a first end 31 of a flexible traction element 32, the traction element 32 being guided via an upper roller 33 and a lower roller 34, which are in each case fixedly arranged. A second end 35 of the traction element 32 is connected to the front end of the seat 7 so that the rear end of the seat 7, when moved back, is automatically lowered down and is forcibly raised when the seat 7 is moved forward.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A vehicle seat comprising:
a longitudinal guide operably connected to the vehicle seat, wherein the seat may be longitudinally adjusted forward and rearward in the direction of travel along the longitudinal guide;
a rear bearing including a gear mechanism supporting a rear of the longitudinal guide; and
a seat surface disposed on the vehicle seat, the seat surface configured for engaging a seat occupant, wherein longitudinal adjustment of the seat rearward actuates the gear mechanism, thereby causing a rearward and downward inclination of the seat surface.

2. The vehicle seat of claim 1, wherein the longitudinal guide includes a front end facing toward a front of a vehicle, and wherein the longitudinal guide extends approximately horizontally and is curved downward toward a rear end thereof.

3. The vehicle seat of claim 1, wherein the longitudinal guide is defined by a seat rail that includes a split configuration such that a front portion and a rear portion have different inclinations.

4. The vehicle seat of claim 2, wherein the longitudinal guide is defined by a seat rail that includes a split configuration such that a front portion and a rear portion have different inclinations.

5. The vehicle seat of claim 4, wherein the rear portion of the seat rail is substantially straight.

6. The vehicle seat of claim 4, wherein the rear portion of the seat rail is curved.

7. The vehicle seat of claim 1, wherein the longitudinal guide is defined by a seat rail that is continuous and slopes down to the rear, and supported on one respective front bearing and rear bearing, and wherein the front bearing is a rotary bearing with a horizontal rotational axis such that the seat rail is lowered depending on the pushed-forward position and pushed-back position of the seat, the extent of the lowering of the seat rail being greater the further the seat is pushed back.

8. A vehicle seat comprising:
a longitudinal guide operably connected to the vehicle seat, wherein the vehicle seat may be longitudinally adjusted forward and rearward in the direction of travel along the longitudinal guide; and
a seat surface disposed on the vehicle seat, wherein longitudinal adjustment of the vehicle seat rearward causes a rearward inclination of the seat surface, wherein the longitudinal guide is defined by a seat rail that is continuous and slopes down to the rear, and supported on one respective front bearing and one respective rear bearing, and wherein the front bearing is a rotary bearing with a horizontal rotational axis such that the seat rail is lowered depending on the pushed-forward position and pushed-back position of the seat, the extent of the lowering of the seat rail being greater the further the seat is pushed back, and further wherein a rear region of the seat rail is forcibly guided in the vertical direction such that the lowering takes place via a mechanical gear mechanism, depending on the position of the seat pushed forward and back, the extent of the lowering being all the greater the further the seat is pushed back.

9. The vehicle seat of claim 4, further comprising:
an approximately horizontally extending portion of the seat rail for supporting a front end of the seat such that a rear end of the seat may be lowered depending on its pushed-back position.

10. A seat for a vehicle comprising:
a longitudinal guide comprising a toothed rod connected to the seat;
a gearwheel proximate a rear of the seat and engaged with the toothed rod connected with the seat, wherein the gearwheel includes an internal thread engaged with a threaded pushrod, such that movement of the seat rearward causes rotation of the gearwheel which moves the threaded pushrod axially downward, resulting in a rearward inclination of a seat surface.

11. The seat of claim 10, wherein the longitudinal guide is defined by a seat rail positioned below the seat.

12. The seat of claim 10, wherein the longitudinal guide is operably connected to the seat by a front bearing positioned below a front portion of the seat.

* * * * *